US005577230A

United States Patent [19]
Argade et al.

[11] Patent Number: 5,577,230
[45] Date of Patent: Nov. 19, 1996

[54] APPARATUS AND METHOD FOR COMPUTER PROCESSING USING AN ENHANCED HARVARD ARCHITECTURE UTILIZING DUAL MEMORY BUSES AND THE ARBITRATION FOR DATA/INSTRUCTION FETCH

[75] Inventors: Pramod V. Argade, Allentown; Michael R. Betker, Sanatoga, both of Pa.

[73] Assignee: AT&T Corp., Murray Hill, N.J.

[21] Appl. No.: 288,420

[22] Filed: Aug. 10, 1994

[51] Int. Cl.[6] .................................................. G06F 13/00
[52] U.S. Cl. .................. 395/477; 395/303; 395/308; 395/309; 395/495; 364/240.2; 364/240.7; 364/242.92; 364/243.3; 364/DIG. 1
[58] Field of Search ........................... 395/450, 303, 395/311, 308, 477, 478, 484, 485, 495; 364/240.2, 240.7, 242.92

[56] References Cited

U.S. PATENT DOCUMENTS

| | | | |
|---|---|---|---|
| 4,855,903 | 8/1989 | Carleton et al. | 395/200.5 |
| 5,034,887 | 7/1991 | Yasui et al. | 395/800 |
| 5,268,995 | 12/1993 | Diefendorff et al. | 395/122 |
| 5,276,836 | 1/1994 | Fukumaru et al. | 395/465 |
| 5,301,295 | 4/1994 | Leary et al. | 395/425 |
| 5,345,566 | 9/1994 | Tanji et al. | 395/308 |
| 5,386,537 | 1/1995 | Asano | 395/484 |
| 5,404,462 | 4/1995 | Datwyler et al. | 395/308 |
| 5,404,486 | 4/1995 | Frank et al. | 395/455 |
| 5,416,910 | 5/1995 | Moyer et al. | 395/325 |

Primary Examiner—Frank J. Asta

[57] ABSTRACT

This arbitration unit includes a request controller and two bus controllers. The request controller monitors the instruction fetch or data requests and causes the two bus controllers to implement an instruction fetch or data transfer through one of the two memory interfaces based upon a preassigned priority. Based upon at least one address bit or a control bit contained on a memory management translation table, the request controller identifies which of the memory interfaces to utilize to fetch or transfer data. Preferably, one of the storage areas is random-access memory and the other is read-only memory containing program instructions and read-only data.

20 Claims, 6 Drawing Sheets

| EVENT | PROGRAM FETCH REQUEST | DATA READ/WRITE REQUEST | BUS TRANSACTION | |
|---|---|---|---|---|
| | | | BUS 1 | BUS 2 |
| 1 | NONE | NONE | — | — |
| 2 | NONE | READ-BUS 1 | DATA READ | — |
| 3 | NONE | READ-BUS 2 | — | DATA READ |
| 4 | NONE | WRITE-BUS 1 | DATA WRITE | — |
| 5 | NONE | WRITE-BUS 2 | — | DATA WRITE |
| 6 | BUS 1 | NONE | PROGRAM FETCH | — |
| 7 | BUS 1 | READ-BUS 1 | DATA READ | — |
| 8 | BUS 1 | READ-BUS 2 | PROGRAM FETCH | DATA READ |
| 9 | BUS 1 | WRITE-BUS 1 | DATA WRITE | — |
| 10 | BUS 1 | WRITE-BUS 2 | PROGRAM FETCH | DATA WRITE |
| 11 | BUS 2 | NONE | — | PROGRAM FETCH |
| 12 | BUS 2 | READ-BUS 1 | DATA READ | PROGRAM FETCH |
| 13 | BUS 2 | READ-BUS 2 | — | DATA READ |
| 14 | BUS 2 | WRITE-BUS 1 | DATA WRITE | PROGRAM FETCH |
| 15 | BUS 2 | WRITE-BUS 2 | — | DATA WRITE |

*FIG. 5*

APPARATUS AND METHOD FOR COMPUTER PROCESSING USING AN ENHANCED HARVARD ARCHITECTURE UTILIZING DUAL MEMORY BUSES AND THE ARBITRATION FOR DATA/INSTRUCTION FETCH

BACKGROUND OF THE INVENTION

1. Field of the Invention

The present invention relates to computer processing apparatus and methods in which an enhanced Harvard Architecture is used in applications such as portable hand-held computing devices, where operating system code, application code, and read-only data are contained in ROM and user data and some application code are in RAM.

2. Description of the Related Art

Currently available microprocessors typically use one of two known architectures for interfacing to memory. These architectures are known as Von Neumann architecture and Harvard Architecture. The memory interfaced to the microprocessor may be integrated with the microprocessor on the same chip or be located external to the microprocessor chip.

In Von Neumann architecture, as shown in FIG. 1, a microprocessor is linked by one interface to a single memory system which is used to store both program instructions and data. Therefore, only program instruction code or data can be transferred to the microprocessor at any given time but not both simultaneously. Conventional Harvard architecture, as shown in FIG. 2, was devised to speed up operation of computers by allowing simultaneous access of program instructions and data which are stored in separate memories. A separate bus interface is provided for each of the two memories to make the simultaneous action possible.

As a result of this dual bus interface, a microprocessor utilizing conventional Harvard architecture requires less cycles to perform the same operations performed by a microprocessor utilizing Von Neumann architecture. This is so because, for example, in a microprocessor with conventional Harvard architecture, an instruction fetch from the program memory can be accomplished simultaneously with a data read/write request to or from data memory.

Thus, conventional Harvard architecture clearly has a performance advantage over Von Neumann architecture. Specifically, under conventional Harvard architecture, the bandwidth, which represents the amount of information (either data or code) transmitted in one cycle between devices, is increased with two interfaces operating simultaneously over separate buses. For this reason, conventional Harvard architecture is commonly found in high performance systems.

There are, however, drawbacks with conventional Harvard architecture which relate to the lack of flexibility in how the memory systems connected to the two interfaces may be used. Problems resulting from this lack of flexibility include: the need to separate program code and read-only data, the inability to support self-modifying code (which requires that the microprocessor be able to modify program memory using data accesses) and increased complexity when testing program memory.

The microprocessor may use non-volatile solid state memory or a mass storage medium such as a hard disk for storing operating system and user application code. Many of these embedded applications require low cost, minimum power dissipation, and low weight. Accordingly, a typical embedded application would use a non-volatile memory such as ROM. The ROM typically contains the operating system code, user application code, and read-only data. ROM access time is generally slower than RAM access time. In systems that use ROM, this deficiency leads to system performance degradation.

Therefore, it is desirable to use a more efficient microprocessor architecture, such as Harvard architecture, which is faster than the Von Neumann architecture in order to make up for the performance degradation associated with ROM. However, since ROM may contain both program instructions, including self-modifying code, and read-only-data, a conventional Harvard architecture approach having dedicated program instruction and data memories each on their own bus would not work in this particular application.

The inability to access program memory as data makes the task of testing program memory more difficult. There are well established procedures which currently exist for testing both RAM and ROM when the microprocessor is able to access the memories through data accesses. These known procedures are different for ROM and RAM. ROM is typically tested through the use of cyclic redundancy checking ("CRC") or checksums which require reading every entry in the ROM. RAM may be tested by writing and then reading known patterns of data and address sequences or built-in-self-test.

Accordingly, a need exists for a computer system architecture for use in mobile or portable computing and high performance system applications, which provides the advantages of the dual bus interface of conventional Harvard architecture while supporting read-only data and self-modifying code wherein both instructions and data may be stored in each of two memory storage areas connected to the microprocessor by independent buses.

SUMMARY OF THE INVENTION

The present invention provides apparatus and methods for computer processing using an enhanced Harvard architecture for a computer system which supports read-only data coexisting with program memory and self-modifying code. The enhanced Harvard architecture incorporates the performance advantages of the conventional Harvard architecture with the flexibility in memory usage provided by the Von Neumann architecture. The microprocessor of the present invention preferably has two interface buses to fetch program code and data, and store data. The interfaces may be identical, having support for arbitrary memory types, or the interfaces may be different.

For example, in a preferred embodiment, one bus may have a dedicated ROM interface if it is desired that only ROM would be interfaced to it. A dedicated ROM interface obviates the need for a separate external bus arbiter and also saves the associated timing penalty. The other interface is preferably a conventional bus interface, supporting arbitrary memory types. Utilizing the enhanced Harvard architecture described herein, the microprocessor may fetch program code and data from the ROM via the ROM interface, while it may fetch program code and data and in addition store data to the other memory via the conventional interface.

The present invention solves the problem of determining over which bus a particular transaction must be made by utilizing a novel on-chip arbitration unit which services the microprocessor's requests for memory accesses to either of the buses, made by an instruction fetch unit or a data read/write unit. The requests specify via which bus the information will be coming, by way of a mechanism such as, for example, a control bit in memory management translation tables. In the case of data, the request specifies whether it is a read or a write request and in the case of a request from the program instruction fetch unit, only read requests are made.

BRIEF DESCRIPTION OF THE DRAWINGS

Preferred embodiments of the invention are described hereinbelow with reference to the drawings, wherein:

FIG. 5 is a truth table of the control process for the arbitration unit of FIG. 4;

DETAILED DESCRIPTION OF THE PREFERRED EMBODIMENTS

Figure 1:
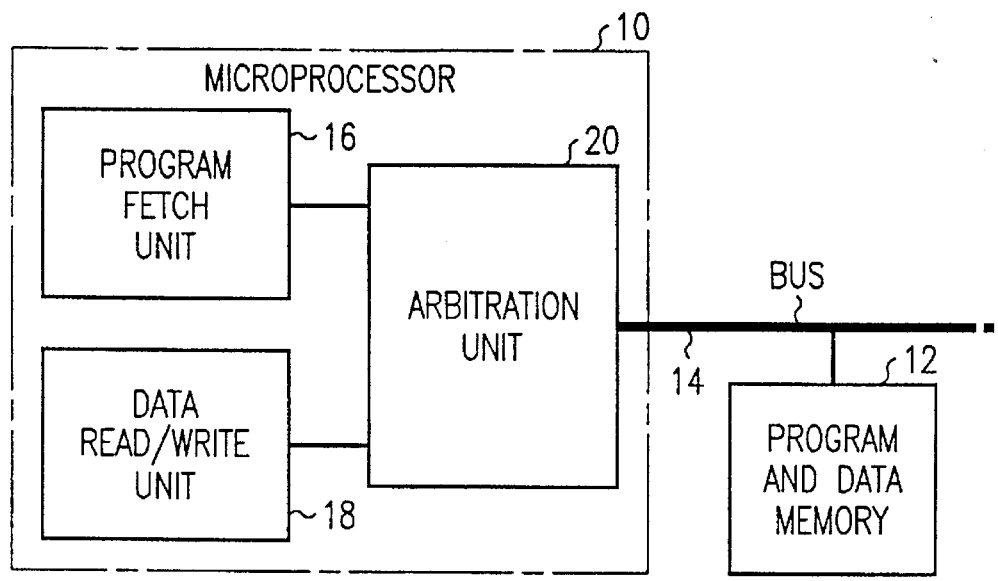
FIGS. 1 and 2 are block diagram illustrations of prior art microprocessor architectures.

In FIG. 1, a prior art microprocessor 10 with a conventional Von Neumann architecture is shown wherein both program instructions and data are stored in an external memory 12 for access by the microprocessor 10. The microprocessor 10 has one input/output ("I/O") bus 14 which interfaces to the external memory 12. The microprocessor 10 contains two known sources of accesses to memory, usually from an instruction or program fetch unit 16 and a data read/write unit 18. Each source is capable of making requests to memory only on the single bus 14. Thus, in order for the microprocessor 10 to make transactions to fetch program code or data or to store data to the external memory 12 it must do so over this single bus 14. Therefore, only program instruction code or data can be supplied at any instant to the microprocessor 10 but not both simultaneously. To service program instruction fetch requests or data read/write requests, initiated from the program fetch unit 16 or the data read/write unit 18, respectively, the microprocessor 10 contains an arbitration unit 20.

Figure 2:
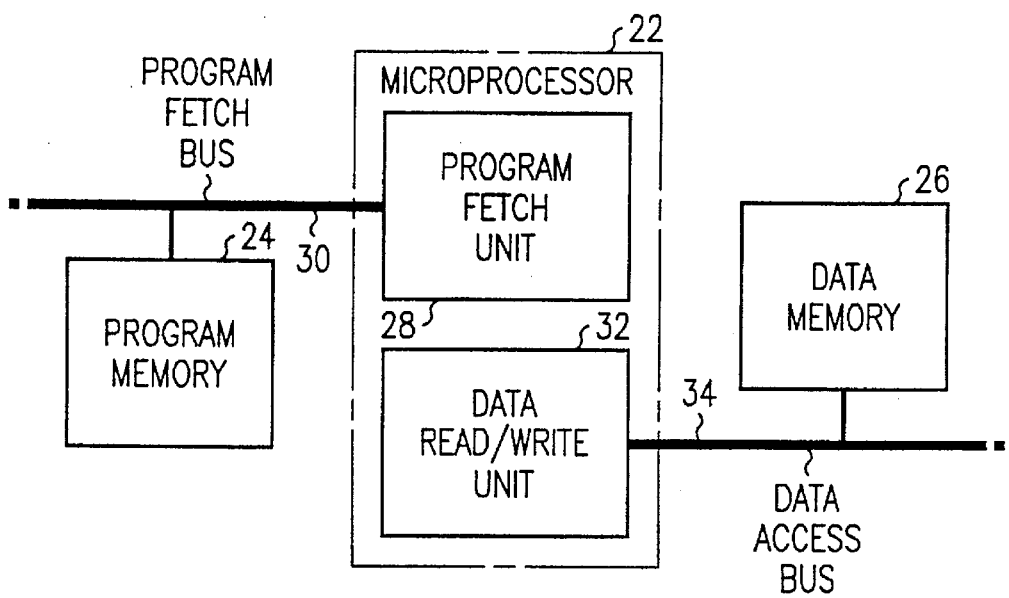

Conventional Harvard architecture, as shown in FIG. 2, has previously been devised to speed up microprocessor operation by reducing the number of clock cycles required to execute instruction fetches and data read/write requests. With conventional Harvard architecture, a microprocessor 22 is interfaced via two separate dedicated interfaces to two independent external memories 24,26. A program memory 24, sometimes referred to as an instruction memory, stores only program instructions, while a data memory 26 stores only data. During a given bus cycle, the program memory 24 supplies program instruction code to the program fetch unit 28, via the program fetch bus 30, and the data memory 26 simultaneously supplies data to the data read/write unit 32, via the data access bus 34.

Figure 3:
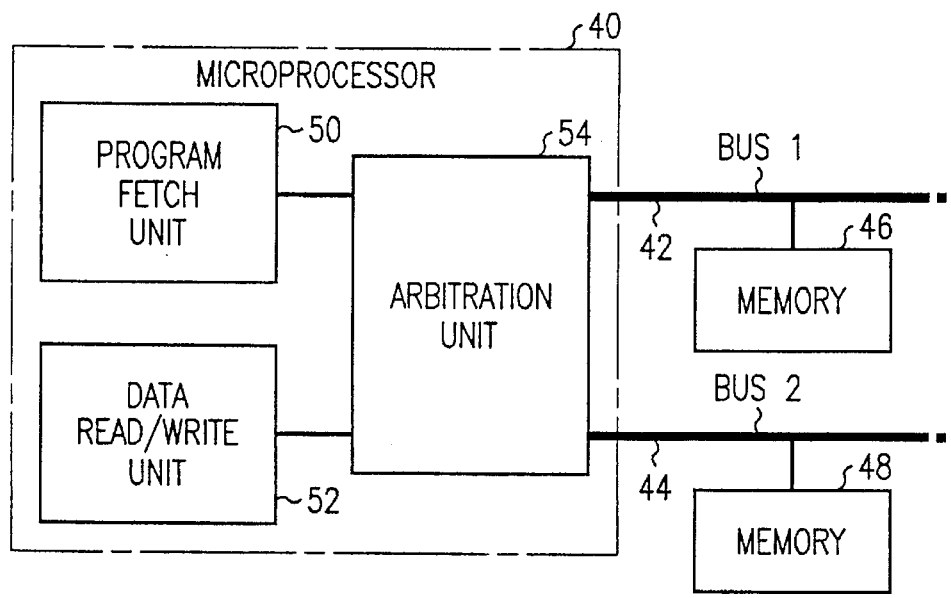
FIG. 3 is a block diagram of the architecture of the present invention.

FIG. 3 shows a block diagram illustrating the architecture of the present invention. The architecture of the present invention although described herein in relation to a microprocessor for the sake of clarity, will be understood by those skilled in the art to be applicable to other integrated computing devices as well, such as, for example, a microcontroller. The microprocessor 40 preferably has two buses 42,44 to interface to two separate memory systems 46,48, respectively. The interfaces may be identical, with support for arbitrary memory types, or the interfaces may be different. An example of the latter would be one interface dedicated to a read-only memory, such as, for example, ROM, PROM, EPROM, FLASH, $E^2PROM$, etc., and the other supporting arbitrary memory types, e.g., RAM. For the purposes of the following description the generic acronyms RAM and ROM will be used and unless otherwise separately noted, will be understood to be referring to the various types of memory known by those skilled in the art which come under those general memory types, such as the ones listed above.

The microprocessor 40 contains two known sources of memory accesses, for example, an instruction fetch unit such as program fetch unit 50 and a data read/write unit 52. Each source is capable of making requests to memory on either of the buses 42, 44 defined above. The request also includes whether it is a read or a write request. If the source is the program fetch unit 50, the request will only be for a read or fetch of a program instruction.

Figure 4:
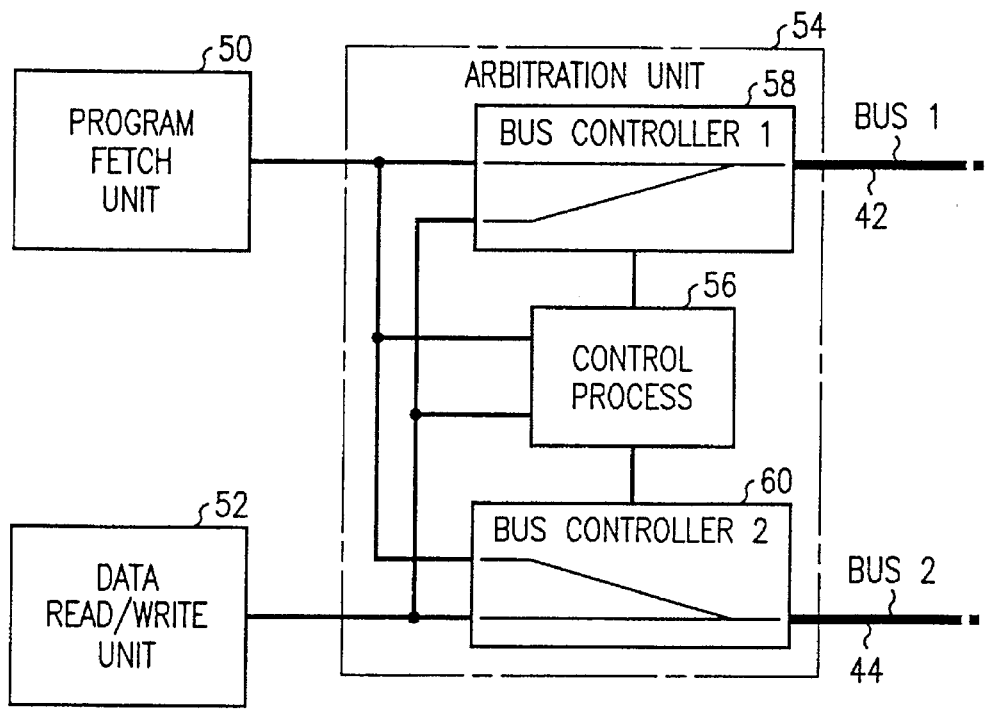
FIG. 4 is a block diagram of the arbitration unit of the present invention.

The microprocessor 40 contains an integral arbitration unit 54 which services the requests for memory accesses originating from either the program fetch unit 50 or data read/write unit 52. As shown in the block diagram of FIG. 4, the arbitration unit 54 is divided into a control process represented by block 56 and two bus controllers 58,60. The control process 56 controls which bus is used for a given request for instruction or data access. Most importantly, the control process 56 determines the actions to be taken when two requests to the same bus occur simultaneously.

The arbitration unit control process 56 controls the operation of each bus controller 58,60. Specifically, the control process 56 defines a mapping between the requests originating from the program fetch unit 50 or data read/write unit 52 to the appropriate bus connections.

Figure 6:
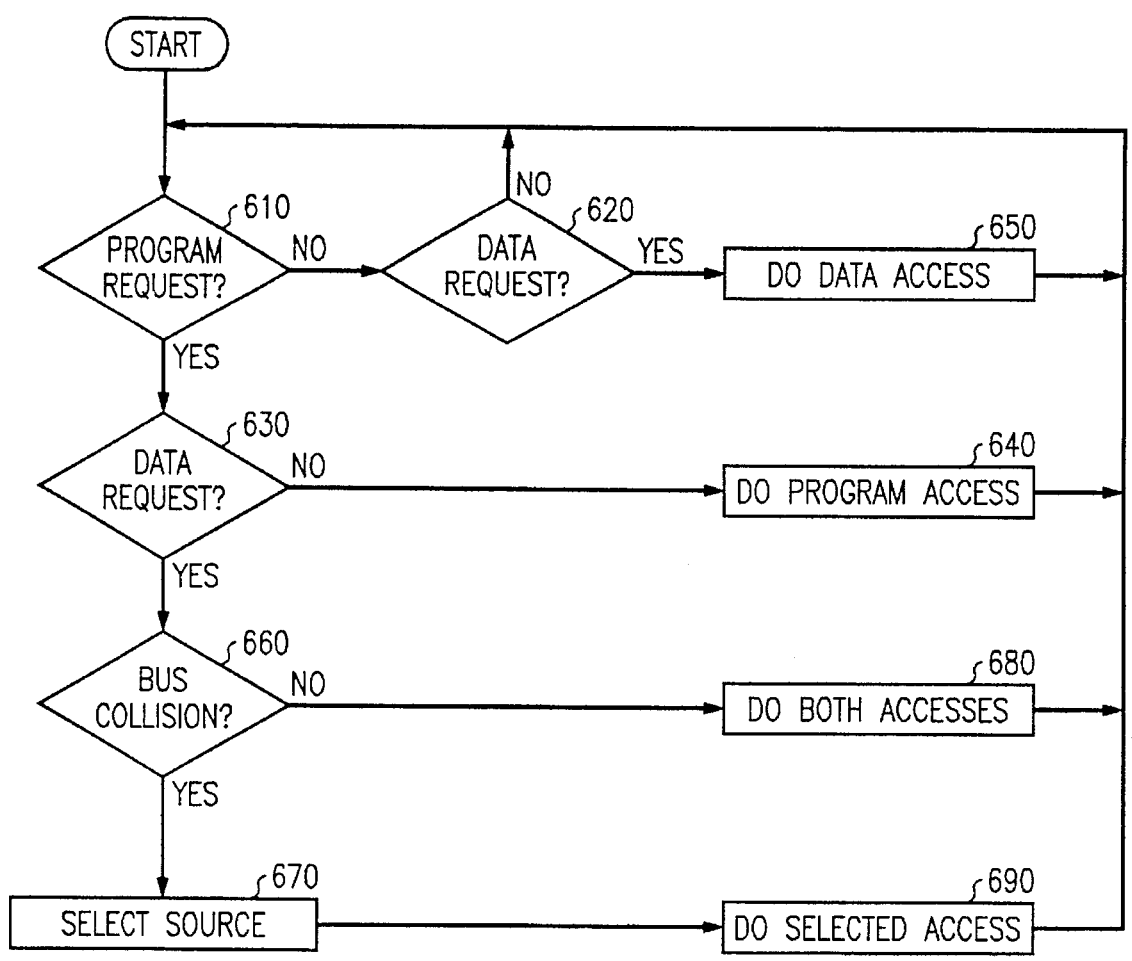
FIG. 6 is a flow chart of the control process for the arbitration unit of FIG. 4.

The mapping of the arbitration unit control process 56 may be represented as a truth table with all the possible request values from both the program fetch unit 50 and data read/write unit 52 as inputs and the bus connections as outputs. FIG. 5 shows an example of a possible truth table listing each possible simultaneous request from the program fetch unit 50 and data read/write unit 52 as numbered "events". Alternatively, either a constant truth table may be used or the control process may adjust the output values of the truth table based on recent requests. It should be understood that numerous different truth tables may be used in place of the truth table of Fig. 5. An example of when adjusting the output values could be of value, would be to give the source that last used a given bus, priority on that bus to allow for more efficient use of burst mode or page mode memories. FIG. 6 shows a flow diagram implementing the truth table of FIG. 5. In particular, FIG. 6 shows a flow diagram of the control process 56 with the box labeled "Select Source" implementing the truth table function when two requests to the same bus occur simultaneously, i.e., executing the selected instruction fetch or data read/write access request given preference through known control process logic circuitry.

The control process 56 is intended to operate in parallel with address decoding so that the connections to the buses may be done by the time the address decoding is able to enable a particular memory 46,48 via a mechanism such as chip select. This allows for minimal time overhead when switching the bus connections.

When the control process 56 sees two requests to the same bus, one of the requests will begin processing and the other will be stalled through the inclusion of wait states.

Referring now to FIG. 5 in conjunction with FIG. 6, in the control process operation, the microprocessor is in a loop (corresponding to Event 1 of the truth table in FIG. 5) until either a program fetch or data read/write request is made (steps 610 and 620). There are four basic request situations: a request for only program instruction (Events 6 and 11); a request for only a data read or write (Events 2–5); requests for both program instruction and either a data read or write where there is no bus conflict (Events 8, 10, 12, and 14); and requests for both program instruction and either a data read or write where there is a bus conflict (Events 7, 9, 13, and 15).

When a request is made for either only program instruction or only data then the appropriate access is immediately satisfied (Events 6 and 11; and 2–5, respectively). When a request is made for both program instruction and data and the requests do not conflict, i.e., they require different buses, (Events 8, 10, 12 and 14), then the control process 56 (step 680) causes the requests to be executed simultaneously. However, when a simultaneous request is made for both program instruction and data on the same bus, as in the affirmative response to step 660 (Events 7, 9, 13 and 15), then the control process 56 (step 670) selects a source based on the preassigned priority of the truth table in FIG. 5, i.e., either the program fetch unit 50 or data read/write unit 52 and initiates the selected access (steps 670, 690) giving that source priority on the bus in conflict. The control process incorporates preassigned priority which may be based upon the needs of the particular application. The "preassigned priority" may be constant, e.g. static or it may be dynamic. Examples of dynamic preassigned priorities are that priority could be given to the request most frequently made on the bus in conflict or to the most recent past request on the bus in conflict.

Figure 7:
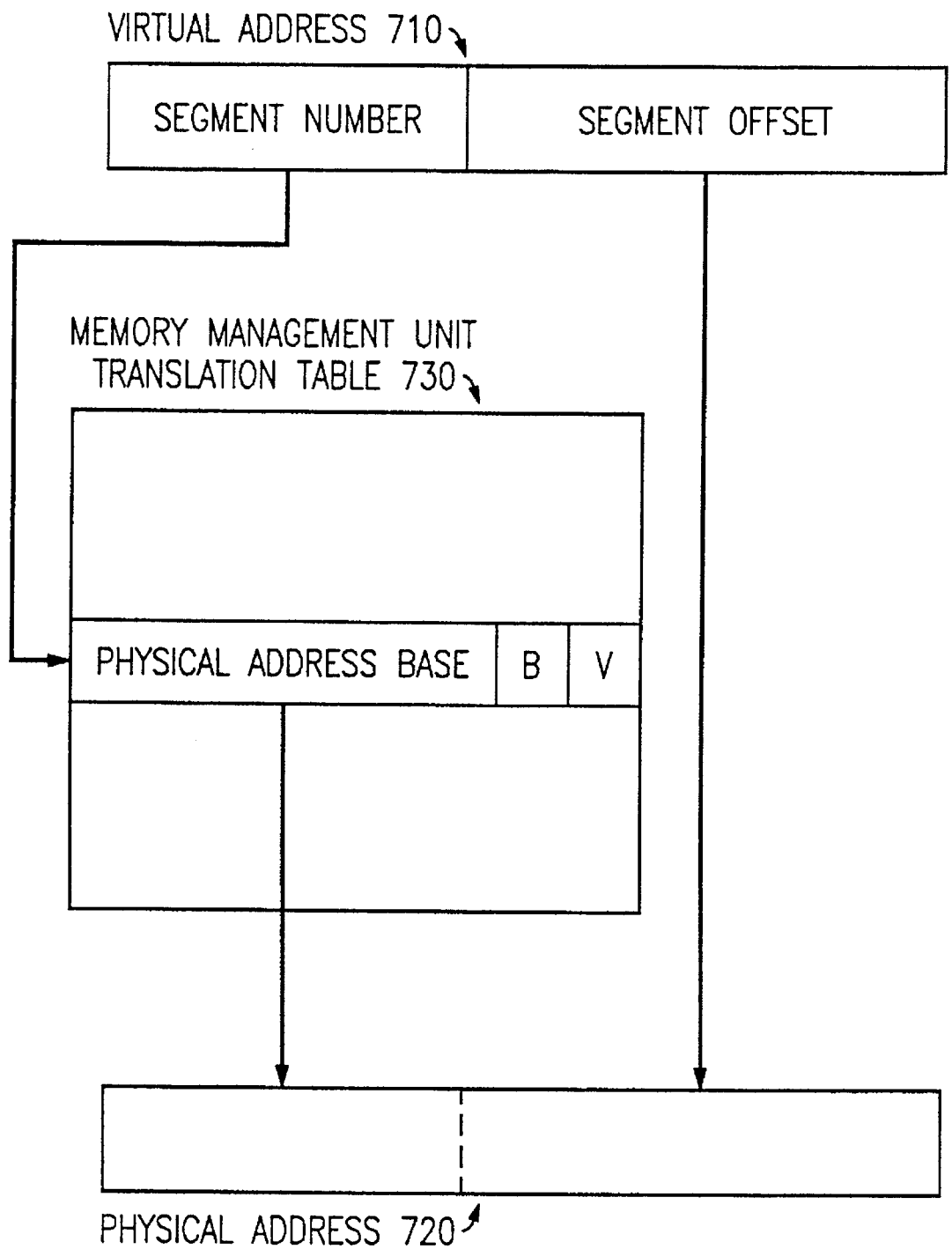
FIG. 7 illustrates the virtual memory translation table mapping scheme of the present invention.

In one illustrative way in which the control process identifies through which bus 42,44 the request should be routed, the program fetch unit 50 and data read/write unit 52 may use a control bit in a memory management translation table or a small number of address bits, possibly only one, to signify which bus the request is for. The former method is illustrated in FIG. 7. The program fetch unit 50 and data read/write unit 52 may involve a virtual memory system; for example, in a preferred embodiment this may be accomplished by incorporating a translation lookaside buffer ("TLB") , where a translation from the virtual address 710 to the physical address 720 is done prior to making a request. In this case, a memory management unit which does the translation may provide a separate bit in its translation table 730 which identifies which bus a particular virtual address is mapped to. An example of this is illustrated in FIG. 7 wherein "V" is a valid bit where a logic 1 contained in this bit represents a valid address and a logic 0 represents an invalid address. The "B" bit is the bus bit wherein a logic 1 contained in this bit indicates that bus 1 (bus 42 of FIGS. 3 and 4) should be used and a logic 0 contained in the bit indicates that bus 2 (bus 44 of FIGS. 3 and 4) should be used.

Associated with the physical address 720 is the physical address base, the offset and the control bits "B" and "V". FIG. 7, however, illustrates only one example of how the virtual address can be translated to the physical address and how the control bits "B" and "V" could be accessed. It is envisioned, however, that other address translation schemes may be utilized.

Figure 8:
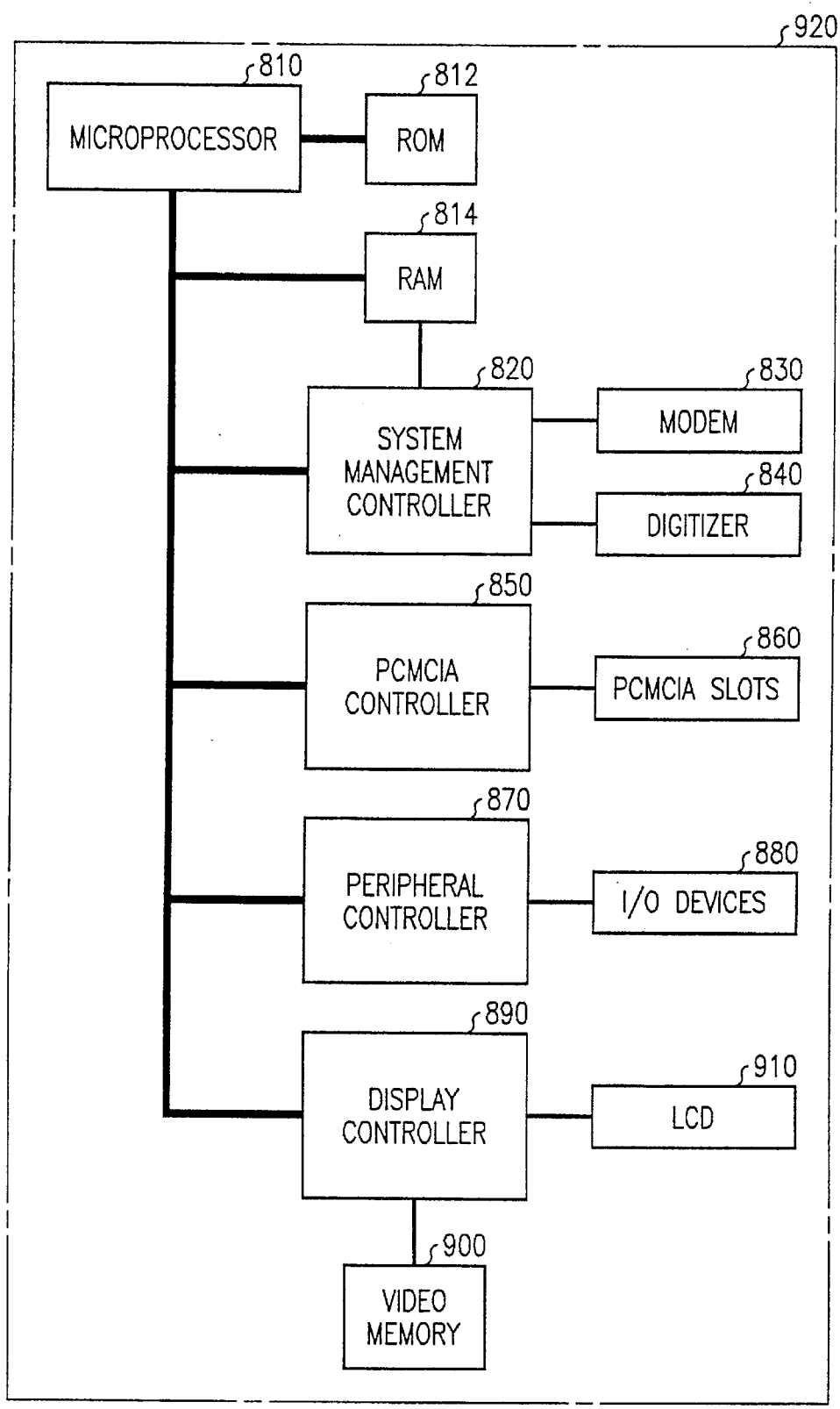
FIG. 8 is a block diagram of a general layout for a mobile or portable personal computing system.

FIG. 8 shows a block diagram of the system layout of an exemplary mobile or hand-held computing system otherwise known as a personal communicating device or personal digital assistant. The microprocessor 810 is configured to utilize the enhanced or modified Harvard architecture described above and is interfaced to a ROM 812 and a RAM 814.

The system management controller 820 essentially provides an arbiter for doing bus arbitration for multiple bus masters; a system clock generator; an interrupt controller for interrupt power management for clock and power supply control; a dynamic RAM and static RAM controller with the RAM refresh locally supported; chip select address decoder; synchronous serial keyboard port; asynchronous communication port for use by, for example, a modem 830; real time clock including a 47 bit counter and alarm and 3 programmable interval timers; and an I/O port for interrupt inputs or status outputs. An example of such a system management controller is the ATT 92011 System Management Controller available from AT&T, N.J.

The Personal Computer Memory Card International Association, Release 2.0 ("PCMCIA") controller 850 is an IEEE standard interface which provides a way to add plug in memory cards through PCMCIA slots 860, for instance which might contain a different application or might have more memory storage on them to store additional information. An example of such a PCMCIA controller is the ATT92012 PCMCIA Controller available from AT&T.

The peripheral controller 870 supports an Industry Standard Architecture ("ISA") interface and Direct Memory Access ("DMA") interface including four DMA channels to generally function as an interface between the processor bus and particular known I/O devices represented by block 880. For example, the peripheral controller would allow connection of the bus to, for example, the bus of a personal computer. It provides an interface between the host processor bus and parallel I/O devices with DMA capability. An example of such a controller is the ATT92013 Peripheral Controller available from AT&T.

The Video Display Controller 890 provides an LCD driver interface or a CRT compatible interface and also preferably has interfaces to a video RAM represented by the block Video Memory 900 which would contain essentially the bit map for the information that is going to be displayed on the LCD 910 or a CRT. An example of such a video display controller is the ATT92014 display controller available from AT&T.

Block 920 represents the housing or enclosure for containing the various components of the system. The housing is preferably configured and dimensioned to be held within the palm of one hand of the user.

What has been described is merely illustrative of the application of the principles of the present invention. Other arrangements and methods can be implemented by those skilled in the art without departing from the spirit and scope of the present invention.

What is claimed is:

1. Apparatus for interfacing computer memory using an enhanced Harvard architecture, which comprises:

a) first memory means for storing program instructions and data;

b) second memory means, for storing program instructions and data, such that program instructions and data may be simultaneously stored in at least one of said first or said second memory means; and c) a processor coupled to the first and second memory means by respective first and second interface buses, the processor including:
   means for requesting fetches of program instructions from the first and second memory means;
   means for requesting transfers of data between the processor and the first memory means and the processor and the second memory means; and means for arbitrating which of the first and second memory bus interfaces a particular program instruction fetch or data transfer is to take place.

2. Apparatus according to claim 1, wherein the arbitration means includes:

a request controller and first and second bus controllers, the request controller being configured to monitor the program instruction fetch requests and data transfer requests and to cause the first and second bus controllers to implement an instruction fetch or data transfer through the first or second memory bus interfaces based upon a preassigned priority.

3. The apparatus according to claim 2, wherein the preassigned priority is dynamic.

4. The apparatus according to claim 2, wherein the request controller identifies which of the memory bus interfaces to utilize based upon at least one address bit used by the fetch requesting means and the data transfer requesting means, which at least one address bit signifies which memory bus interface the request is for.

5. The apparatus according to claim 2, wherein the request controller identifies which of the memory bus interfaces to utilize based upon a control bit contained on a memory management translation table wherein the control bit signifies which memory bus interface the request is for.

6. The apparatus according to claim 1, wherein the first memory means is a random-access memory means.

7. The apparatus according to claim 1, wherein the second memory means is a read-only memory means containing program instructions and read-only data.

8. The apparatus according to claim 1, wherein at least a portion of the program instructions may include self-modifying code which generates instruction data, which instruction data in turn is executable as a program instruction.

9. A hand-held mobile computer which comprises:

a) a first memory configured to store both program instructions and data;

b) a second memory configured to store program instructions and data, such that program instructions and data may be simultaneously stored in at least one of said first or said second memories; and c) a processor coupled to the first and second memories by respective first and second interface buses, the processor including stored programs configured to:
request fetches of program instructions from the first and second memories;
request transfers of data between the processor and the first memory and between the processor and the second memory; and
arbitrate which of the first and second memory bus interfaces a particular program instruction fetch or data transfer is to take place.

10. A hand-held mobile computer according to claim 9, wherein the processor further includes:

a request controller to monitor and direct program instruction fetch requests and data read/write transfer requests from the program instruction fetch request portion and the data transfer request portion, respectively, between the processor and the first and second memories; and
first and second bus controllers, coupled to the request controller and configured to implement access through the first or second memory bus interfaces based upon a prearranged priority of the request controller.

11. A hand-held mobile computer according to claim 10, wherein the prearranged priority is dynamic.

12. A hand-held mobile computer according to claim 10, wherein the request controller identifies which memory bus interface to utilize based upon an address bit used by the program fetch request portion and the data read/write request portion, which address signifies which memory bus interface the request is for.

13. A hand-held mobile computer according to claim 10, wherein the request controller identifies which of the memory bus interfaces to utilize based upon a control bit contained on a memory management translation table wherein the control bit signifies which memory bus interface the request is for.

14. A hand-held mobile computer according to claim 9, wherein the first memory storage is a random-access memory.

15. A hand-held mobile computer according to claim 9, wherein the second memory storage means is a read-only memory containing program instructions and read-only data.

16. The hand-held mobile computer according to claim 9, wherein at least a portion of the program instructions to be stored therein include self-modifying code which generates instruction data, which instruction data in turn is executable as a program instruction.

17. A method of performing program instruction fetches and data write/read requests in a mobile hand-held computer system utilizing an enhanced Harvard architecture, comprising the steps of:

a) processing program instructions and data with a processor;

b) determining which of a first and second memory interface buses is to be used to access a particular program instruction fetch or satisfy a data read/write request;

c) fetching program instructions on at least one of the first and second interface buses from one of a first and second external memory areas wherein the first external memory area is configured to store both program instructions and data, and the second external memory area is configured to store both program instructions and data such that program instructions and data may be simultaneously stored in at least one of said first and second external memory areas; and d) accessing data through at least one of the first and second interfaces from one of the first and second external memory areas.

18. A method of performing program instruction fetches and data write/read requests according to claim 17, wherein the processor further includes:

a request controller to monitor and direct program instruction fetch requests and data read/write transfer requests between the processor and the first and second external memory areas; and first and second bus controllers, coupled to the request controller and configured to implement access through the first or second interface buses based upon a prearranged priority of the request controller.

19. A method of performing program instruction fetches and data write/read requests according to claim 18, wherein the prearranged priority is dynamic.

20. A method of performing program instruction fetches and data write/read requests according to claim 18, wherein the request controller identifies which interface bus to utilize based upon an address bit which signifies which interface bus the request is for.

* * * * *